(12) United States Patent
Rosson et al.

(10) Patent No.: US 10,472,967 B2
(45) Date of Patent: Nov. 12, 2019

(54) OLDHAM COUPLING FOR A SCROLL COMPRESSOR

(71) Applicant: Danfoss Commercial Compressors, Trevoux (FR)

(72) Inventors: Yves Rosson, Nordborg (DK); Philippe Dugast, Nordborg (DK)

(73) Assignee: Danfoss Commercial Compressors, Trevoux (FR)

( * ) Notice: Subject to any disclaimer, the term of this patent is extended or adjusted under 35 U.S.C. 154(b) by 287 days.

(21) Appl. No.: 15/647,343

(22) Filed: Jul. 12, 2017

(65) Prior Publication Data

US 2018/0023393 A1 Jan. 25, 2018

(30) Foreign Application Priority Data

Jul. 25, 2016 (FR) ..................... 16 57119

(51) Int. Cl.
| | |
|---|---|
| *F01C 17/06* | (2006.01) |
| *F04C 18/02* | (2006.01) |
| *F16D 3/04* | (2006.01) |
| *F04C 23/00* | (2006.01) |

(52) U.S. Cl.
CPC ........ *F01C 17/066* (2013.01); *F04C 18/0207* (2013.01); *F04C 18/0215* (2013.01); *F16D 3/04* (2013.01); *F04C 23/008* (2013.01); *F04C 2240/40* (2013.01)

(58) Field of Classification Search
CPC ................ F01C 17/066; F04C 29/0057; F04C 18/0207; F04C 18/0215; F16D 3/04
See application file for complete search history.

(56) References Cited

U.S. PATENT DOCUMENTS

| | | |
|---|---|---|
| 6,231,324 B1 | 5/2001 | Clendenin |
| 2013/0209304 A1 | 8/2013 | Li |
| 2017/0241420 A1* | 8/2017 | Nouyrigat ........... F04C 18/0215 |

FOREIGN PATENT DOCUMENTS

| | | |
|---|---|---|
| GB | 2159884 | 12/1985 |
| JP | S58170880 A | 10/1983 |
| WO | 2008023417 | 2/2008 |

* cited by examiner

*Primary Examiner* — Mary Davis
(74) *Attorney, Agent, or Firm* — Carlson, Gaskey & Olds, P.C.

(57) ABSTRACT

An Oldham coupling includes an annular ring having a first side and a second side opposite to the first side, a first and a second engaging groove that are diametrically opposed and located on the first side, and a third and a fourth engaging groove that are diametrically opposed and located on the second side. The first and second engaging grooves are configured to be engaged with a first and a second engaging projection provided on a fixed element. The third and fourth engaging grooves are configured to be engaged with a third and a fourth engaging projection provided on an orbiting scroll. The first and third engaging grooves are located in a first angular sector, and the second and fourth engaging grooves are located in a second diametrically opposed angular sector of the annular ring, the first and second angular sectors have an opening angle less than 40°.

15 Claims, 6 Drawing Sheets

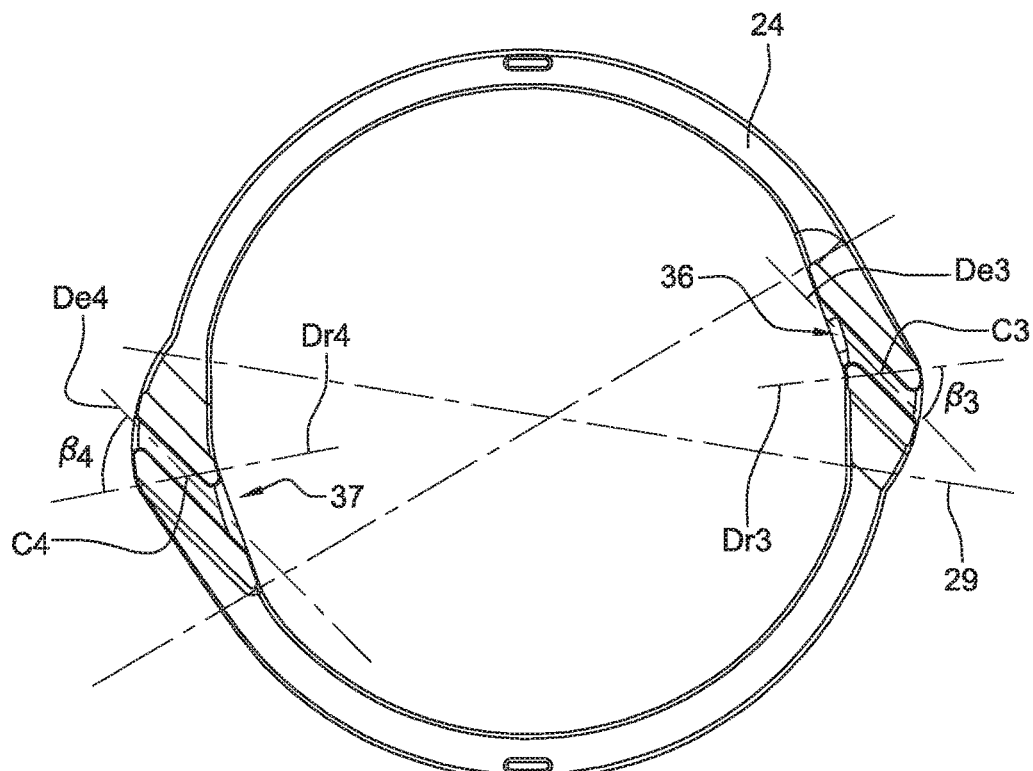
Fig. 4
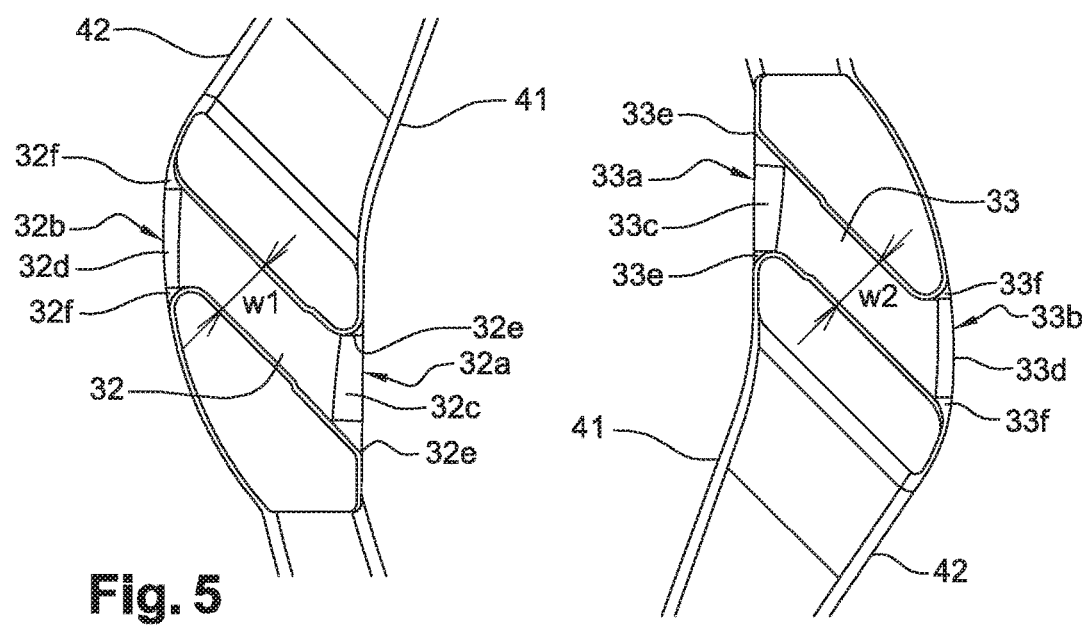
Fig. 5
Fig. 6

OLDHAM COUPLING FOR A SCROLL COMPRESSOR

CROSS-REFERENCE TO RELATED APPLICATIONS

This application claims priority to FR 1657119, filed Jul. 25, 2016.

FIELD OF THE INVENTION

The present invention relates to an Oldham coupling for a scroll compressor.

BACKGROUND

Scroll compressors are known and typically include a closed container. A compression unit is disposed in the closed container, including a fixed scroll including a fixed base plate and a fixed spiral wrap, and an orbiting scroll including an orbiting base plate and an orbiting spiral wrap. The fixed spiral wrap and the orbiting spiral wrap fit together, forming a plurality of compression chambers.

Scroll compressors typically further include a drive shaft including a driving portion configured to drive the orbiting scroll in an orbital movement. An Oldham coupling is configured to prevent rotation of the orbiting scroll with respect to the fixed scroll.

The Oldham coupling typically includes an annular ring having a first side and a second side opposite to the first side A first and a second engaging projection are configured to be slidably engaged to a first and a second complementary engaging groove provided on the fixed scroll of the scroll compressor. The first and second engaging projections are diametrically opposed to each other and projecting from the first side of the annular ring.

The Oldham coupling typically further includes a third and a fourth engaging projection configured to be slidably engaged with a third and a fourth complementary engaging groove provided on the orbiting scroll of the scroll compressor. The third and fourth engaging projections are diametrically opposed to each other and project from the second side of the annular ring. The third and fourth engaging projections are angularly offset from the first and second engaging projections by an angle of about 90°.

Such a location of the first, second, third and fourth engaging projections decreases space for the fixed and orbiting spiral wraps on the scroll compressor. This limits the displacement of the compression unit and thereby limits the performances of the scroll compressor.

Further the configuration of the first, second, third and fourth engaging projections results in a significant tipping moment of the Oldham coupling, which may lead to a twisting of the Oldham coupling. This twisting may induce an improper sliding of the first, second, third and fourth engaging projections in the first, second, third and fourth engaging grooves, and may harm the efficiency of the compression unit.

Moreover, due to the fact that an Oldham coupling is usually made of a low weight material, and particularly of aluminium, the first, second, third and fourth engaging projections may possibly break under the mechanical stresses applied on said engaging projections, which may be detrimental to the reliability of the scroll compressor.

SUMMARY

In a featured embodiment, an Oldham coupling for use in a scroll compressor includes an annular ring having a first side and a second side opposite to the first side, and a first and a second engaging groove configured to be slidably engaged with a first and a second complementary engaging projection provided on a non-orbiting element. The first and second engaging grooves are diametrically opposed to each other and provided on the first side of the annular ring. The Oldham coupling further includes a third and a fourth engaging groove configured to be slidably engaged with a third and a fourth complementary engaging projection provided on an orbiting scroll of a scroll compressor. The third and fourth engaging grooves are diametrically opposed to each other and provided on the second side of the annular ring. The first and third engaging grooves are located in a first angular sector of the annular ring, and the second and fourth engaging grooves are located in a second angular sector of the annular ring, diametrically opposed to the first angular sector. The first and second angular sectors each have an opening angle less than 40°. A depth of the first engaging groove is less than a depth of the third engaging groove, and a depth of the second engaging groove is less than a depth of the fourth engaging groove.

In another embodiment according to the previous embodiments, the first and second angular sectors each have an opening angle less than 30°.

In another embodiment according to the previous embodiments, the non-orbiting element on which the first and second complementary engaging projections are provided is the non-orbiting scroll or a fixed support member of the scroll compressor.

In another embodiment according to the previous embodiments, the first and third engaging grooves are configured such that projections of said first and third engaging grooves extend in a plane perpendicular to a center axis of the annular ring and are secant with respect to the annular ring, and the second and fourth engaging grooves are configured such that projections of said second and fourth engaging grooves extend in a plane perpendicular to the center axis of the annular ring, and are secant with respect to the annular ring.

The first and third engaging grooves are at least partially superposed, and the second and fourth engaging grooves are at least partially superposed, when the annular ring is positioned substantially horizontal. In other words, at least a portion of the first engaging groove extends vertically above at least a portion of the third engaging groove, and at least a portion of the second engaging groove extends vertically above at least a portion of the fourth engaging groove, when the annular ring is positioned substantially horizontal.

In another embodiment according to the previous embodiments, the first and third engaging grooves extend substantially at a right angle with respect to each other, and the second and fourth engaging grooves extend substantially at a right angle relative to each other.

In another embodiment according to the previous embodiments, a first axial distance between bottoms of the first and third engaging grooves is less than a half of a depth of the first engaging groove, and a second axial distance between bottoms of the second and fourth engaging grooves is less than a half of a depth of the second engaging groove.

In another embodiment according to the previous embodiments, the first axial distance is less than a third of the depth of the first engaging groove, and the second axial distance is less than a third of the depth of the second engaging groove.

In another embodiment according to the previous embodiments, the first axial distance is less than a quarter of the depth of the first engaging groove, and the second axial distance is less than a quarter of the depth of the second engaging groove.

In another embodiment according to the previous embodiments, a width of the first engaging groove is less than a width of the third engaging groove, and a width of the second engaging groove is less than a width of the fourth engaging groove.

In another embodiment according to the previous embodiments, each of the first, second, third and fourth engaging grooves include an inner groove end and an outer groove end emerging on an inner perimeter surface and an outer perimeter surface of the annular ring respectively.

In another embodiment according to the previous embodiments, the bottom of each of the first, second, third and fourth engaging grooves includes an inner bottom edge and an outer bottom edge, the inner and outer bottom edges of at least one of the first, second, third and fourth engaging grooves being delimited by an inner rounded convex surface and an outer rounded convex surface respectively.

In another embodiment according to the previous embodiments, the radius of curvature of the inner and outer rounded convex surfaces is between 1 and 5 mm.

In another embodiment according to the previous embodiments, the inner and outer bottom edges of each of the first, second, third and fourth engaging groove are delimited by an inner rounded convex surface and an outer rounded convex surface respectively.

In another embodiment according to the previous embodiments, the inner groove ends of the first and third engaging grooves are angularly offset from each other by a first inner distance greater than twice the width of the first engaging groove, and the inner groove ends of the second and fourth engaging grooves are angularly offset from each other by a second inner distance greater than twice a width of the second engaging groove.

In another embodiment according to the previous embodiments, the Oldham coupling further includes a first and second protrusion part projecting from the first side of the annular ring, the first and second engaging grooves being provided at least partially on the first and second protrusion parts respectively. A third and fourth protrusion part project from the second side of the annular ring, the third and fourth engaging grooves being provided at least partially on the third and fourth protrusion parts respectively. The first and third protrusion parts are located in the first angular sector of the annular ring, and the second and fourth protrusion parts are located in the second angular sector of the annular ring.

In another embodiment according to the previous embodiments, depths of the first, second, third and fourth engaging grooves are respectively greater than heights of the first, second, third and fourth protrusion parts.

In another embodiment according to the previous embodiments, the first and second engaging grooves extend along a first and a second extension direction respectively, the first and second extension directions being substantially parallel to each other, and the third and fourth engaging grooves extend along a third and a fourth extension direction respectively, the third and fourth extension directions being substantially parallel to each other.

In another embodiment according to the previous embodiments, the first and second extension directions are angled with respect to a first and a second radial direction which intersect a first and a second center portion of the first and second engaging grooves respectively, and the third and fourth extension directions are angled with respect to a third and a fourth radial direction which intersect a third and a fourth center portion of the third and fourth engaging grooves respectively.

In another embodiment according to the previous embodiments, the first and second extension directions extend at an angle between 45 and 65°, advantageously between 50 and 60°, and in one example at about 55°, with respect to the first and second radial directions, and the third and fourth extension directions respectively extend at an angle between 45 and 65°, advantageously between 50 and 60°, and in one example at about 55°, with respect to the third and fourth radial directions.

In another featured embodiment, a scroll compressor includes a compression unit including a non-orbiting scroll having a non-orbiting base plate and a non-orbiting spiral wrap, and an orbiting scroll having an orbiting base plate and an orbiting spiral wrap. The non-orbiting spiral wrap and the orbiting spiral wrap form a plurality of compression chambers. The scroll compressor further includes a drive shaft including a driving portion configured to drive the orbiting scroll in an orbital movement, and an Oldham coupling according to claim 1.

In another embodiment according to the previous embodiments, the scroll compressor further includes a fixed support member configured to slidably support the orbiting scroll, the Oldham coupling being disposed between the orbiting scroll and one of the fixed scroll and the fixed support member.

In another embodiment according to the previous embodiments, one of the non-orbiting scroll and the fixed support member includes a first and a second engaging projection configured to be slidably engaged with the first and second engaging grooves provided on the Oldham coupling, and the orbiting scroll includes a third and a fourth engaging projection configured to be slidably engaged with the third and fourth engaging grooves provided on the Oldham coupling.

In another embodiment according to the previous embodiments, the Oldham coupling extends around the non-orbiting spiral wrap and the orbiting spiral wrap.

In another embodiment according to the previous embodiments, the annular ring is disposed between the orbiting base plate and the non-orbiting base plate, or between the orbiting base plate and the fixed support member.

In another embodiment according to the previous embodiments, the first and second engaging projections are substantially parallel to each other, and the third and fourth engaging projections extend substantially parallel to each other.

In another embodiment according to the previous embodiments, each of the first, second, third and fourth engaging projections is an engaging rib.

In another embodiment according to the previous embodiments, the first and second engaging projections are diametrically opposed to each other, and the third and fourth engaging projections are diametrically opposed to each other.

In another embodiment according to the previous embodiments, the first and second engaging projections are provided on the non-orbiting base plate, and the third and fourth engaging projections are provided on the orbiting base plate.

In another embodiment according to the previous embodiments, the first engaging projection is located substantially vertically above the third engaging projection, and the second engaging projection is located substantially vertically above the fourth engaging projection.

These and other features may be best understood from the following drawings and specification.

BRIEF DESCRIPTION OF THE DRAWINGS

FIGS. 3 and 4 are top and bottom views of the Oldham coupling of FIG. 1.

FIGS. 5 and 6 are enlarged views of details of FIG. 3.

DETAILED DESCRIPTION

Figure 1:
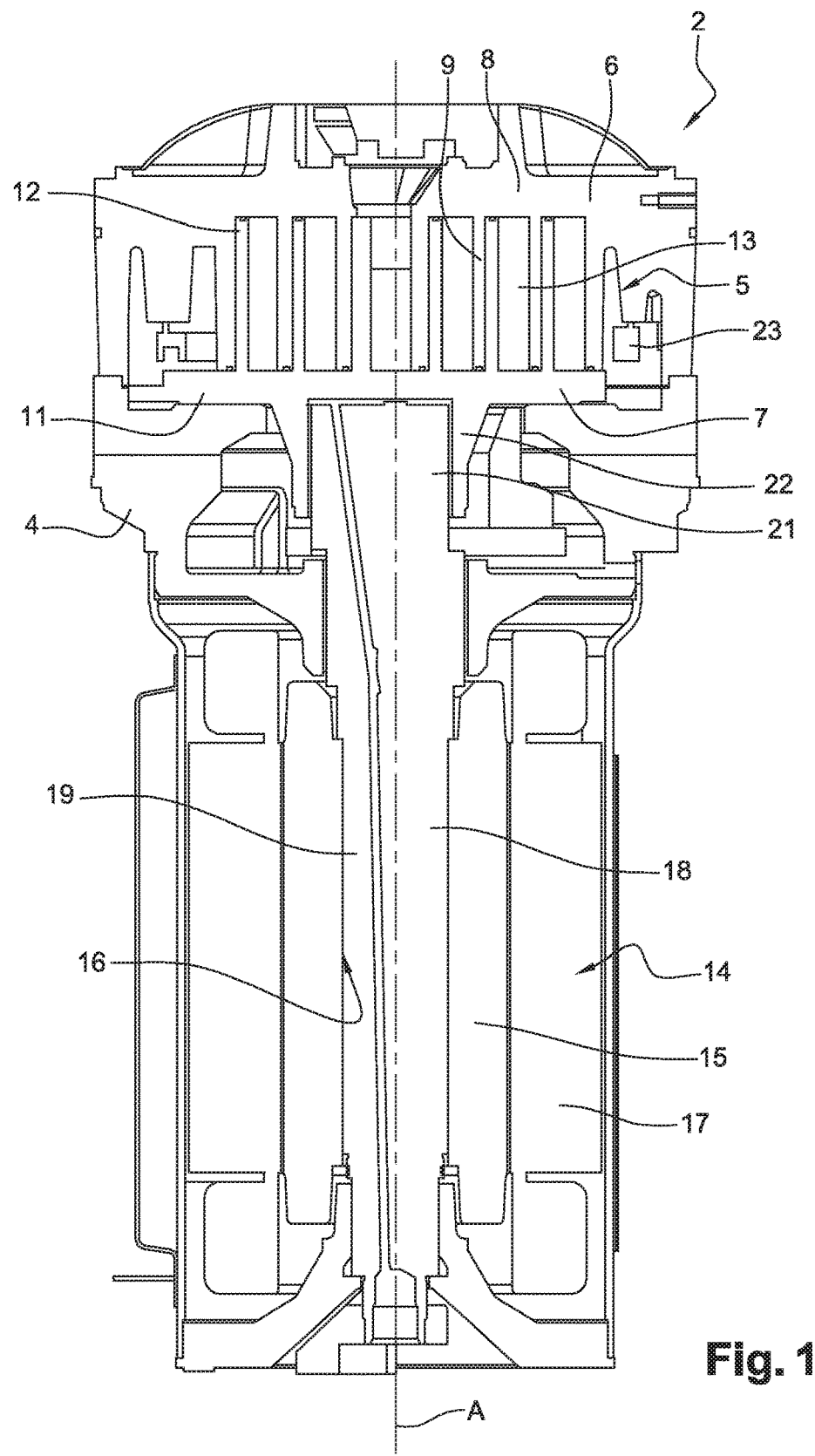
FIG. 1 is a partial longitudinal section view of a scroll compressor including an Oldham coupling according to the invention.

FIG. 1 shows a scroll compressor 2 extending vertically. However, a scroll compressor 2 according to this disclosure could extend horizontally without requiring significant modification to its structure.

The scroll compressor 2 includes a closed container (not shown on the figures), a fixed support member 4, also called a crankcase, fixed in the closed container, and a compression unit 5 disposed inside the closed container and above the fixed support member 4. The scroll compression unit 5 includes a fixed scroll 6 and an orbiting scroll 7. The fixed and orbiting scrolls 6, 7 may be made from cast iron.

The fixed scroll 6 includes a fixed base plate 8 and a fixed spiral wrap 9 projecting from the fixed base plate 8 towards the orbiting scroll 7. The orbiting scroll 7 includes an orbiting base plate 11 slidably mounted on the fixed support member 4, and an orbiting spiral wrap 12 projecting from the orbiting base plate 11 towards the fixed scroll 6.

The orbiting spiral wrap 12 of the orbiting scroll 7 meshes with the fixed spiral wrap 9 of the fixed scroll 6 to form a plurality of compression chambers 13 between them. Each of the compression chambers 13 has a variable volume which decreases from the outside towards the inside, when the orbiting scroll 7 is driven to orbit relative to the fixed scroll 6.

The scroll compressor 2 further includes an electric driving motor 14 having a rotor 15 provided with an axial through passage 16, and a stator 17 disposed around the rotor 15.

The scroll compressor 2 also includes a drive shaft 18 configured to drive the orbiting scroll 7 in an orbital movement. The drive shaft 18 includes a driving portion 19 extending in the axial direction through passage 16 of the rotor 15 and coupled to the rotor 15, so that the drive shaft 18 is driven to rotate by the rotor 15 about a rotation axis A. The drive shaft 18 includes, at its top end, an eccentric driving portion 21 which is off-centered from the center axis of the drive shaft 18. The eccentric driving portion 21 is inserted in a connecting sleeve part 22 provided on the orbiting scroll 7 to cause the orbiting scroll 7 to be driven in an orbital motion relative to the fixed scroll 6 when the driving motor 14 is operated.

The scroll compressor 2 further includes an Oldham coupling 23 configured to prevent rotation of the orbiting scroll 7 with respect to the fixed scroll 6. The Oldham coupling 23 is slidably mounted with respect to the fixed scroll 6. The Oldham coupling 23 may be made from aluminium.

Figure 2:
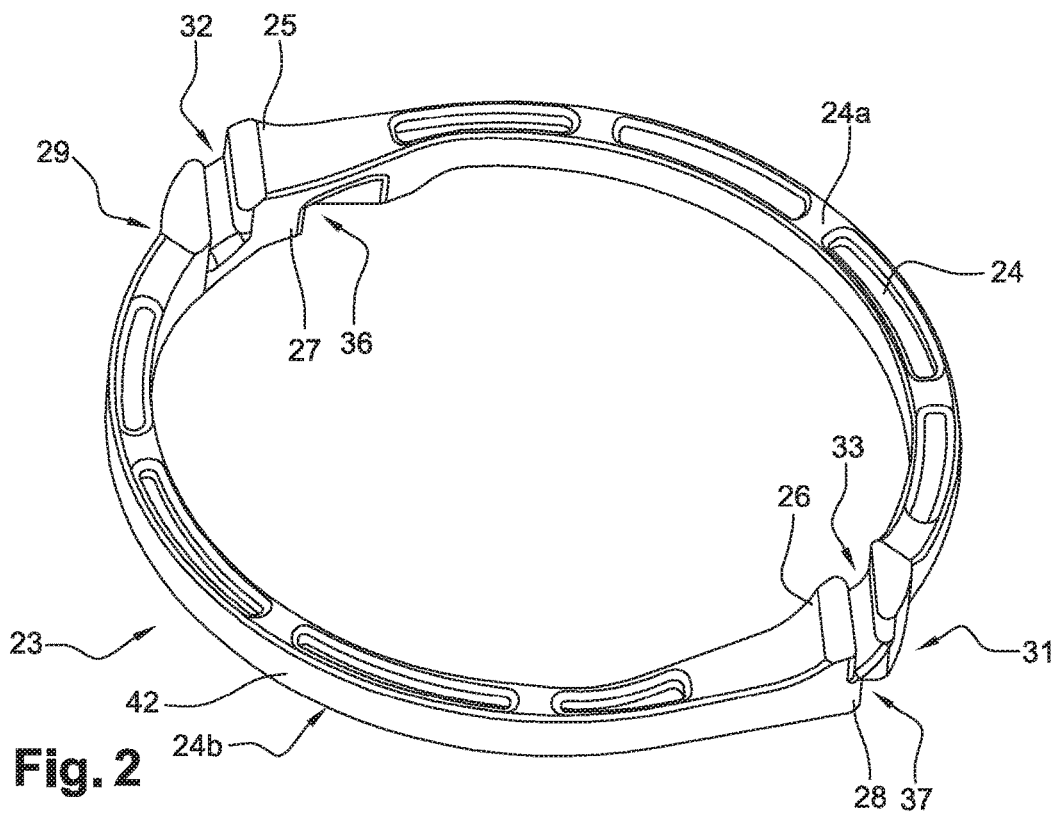
FIG. 2 is a perspective view of the Oldham coupling of FIG. 1.

Turning to FIG. 2, the Oldham coupling 23 includes an annular ring 24 disposed between the orbiting base plate 11 and the fixed base plate 8, and around the fixed spiral wrap 9 and the orbiting spiral wrap 12.

The annular ring 24 includes a first protrusion part 25 and a second protrusion part 26 each projecting from a first side 24a of the annular ring 24. The annular ring 24 further includes a third protrusion part 27 and a fourth protrusion part 28 each projecting from a second side 24b opposite to the first side 24a. The first and second protrusion parts 25, 26 are diametrically opposed to each other, while the third and fourth protrusion parts 27, 28 are diametrically opposed to each other.

The first and third protrusion parts 25, 27 are located in a first angular sector 29 of the annular ring 24, and the second and fourth protrusion parts 26, 28 are located in a second angular sector 31 of the annular ring 24. Angular sector 31 is diametrically opposed to the first angular sector 29.

The first and third protrusion parts 25, 27 are at least partially superposed, and the second and fourth protrusion parts 26, 28 are at least partially superposed, when the annular ring 24 extends substantially horizontally.

Figure 14:
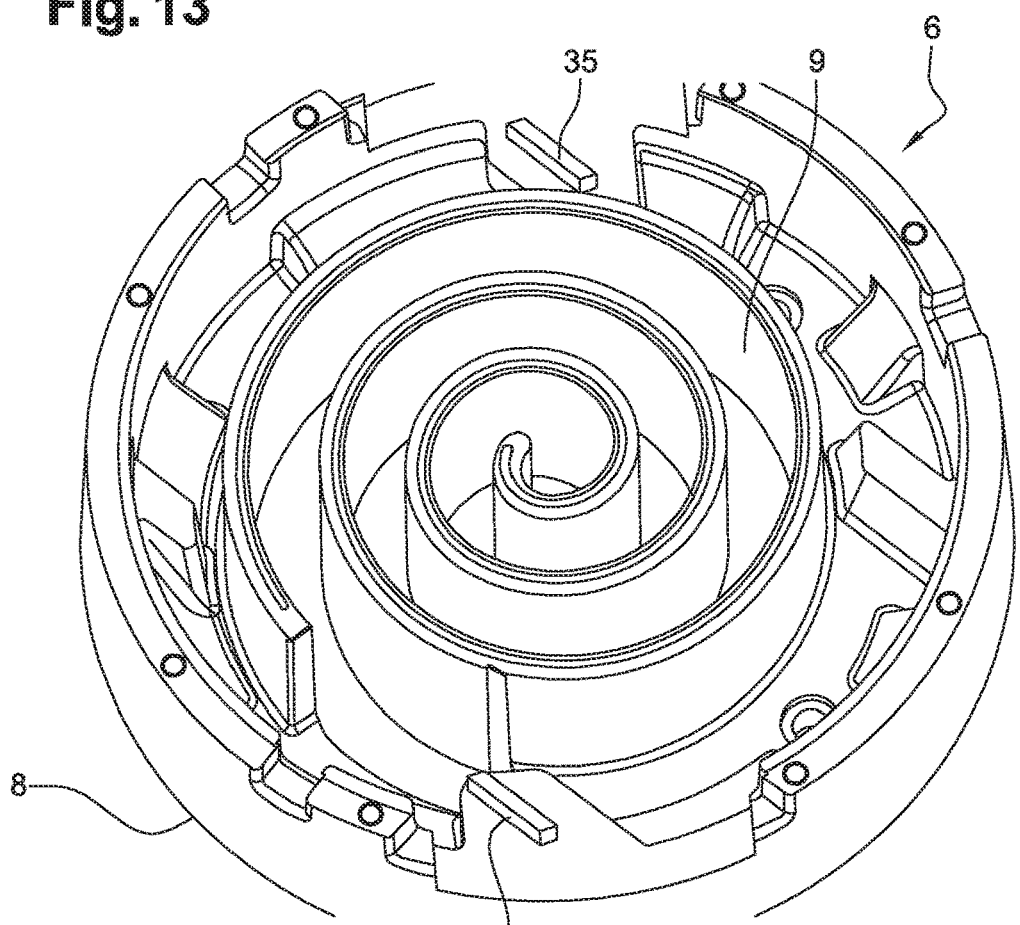
FIG. 14 is a perspective view of a fixed scroll of the scroll compressor of FIG. 1.

Annular ring 24 also includes a first engaging groove 32 and a second engaging groove 33 configured to slidably receive a first complementary engaging rib 34 and a second complementary engaging rib 35 provided on the fixed base plate 8, as can be appreciated from FIG. 14. The engaging ribs improve the mechanical strength of the engaging projection compared to conventional engaging pins. The first and second engaging grooves 25, 26 are diametrically opposed to each other, and are provided at least partially on the first and second protrusion parts 25, 27 respectively. The first and second engaging ribs 34, 35 are parallel to each other, and are diametrically opposed to each other.

Figure 3:
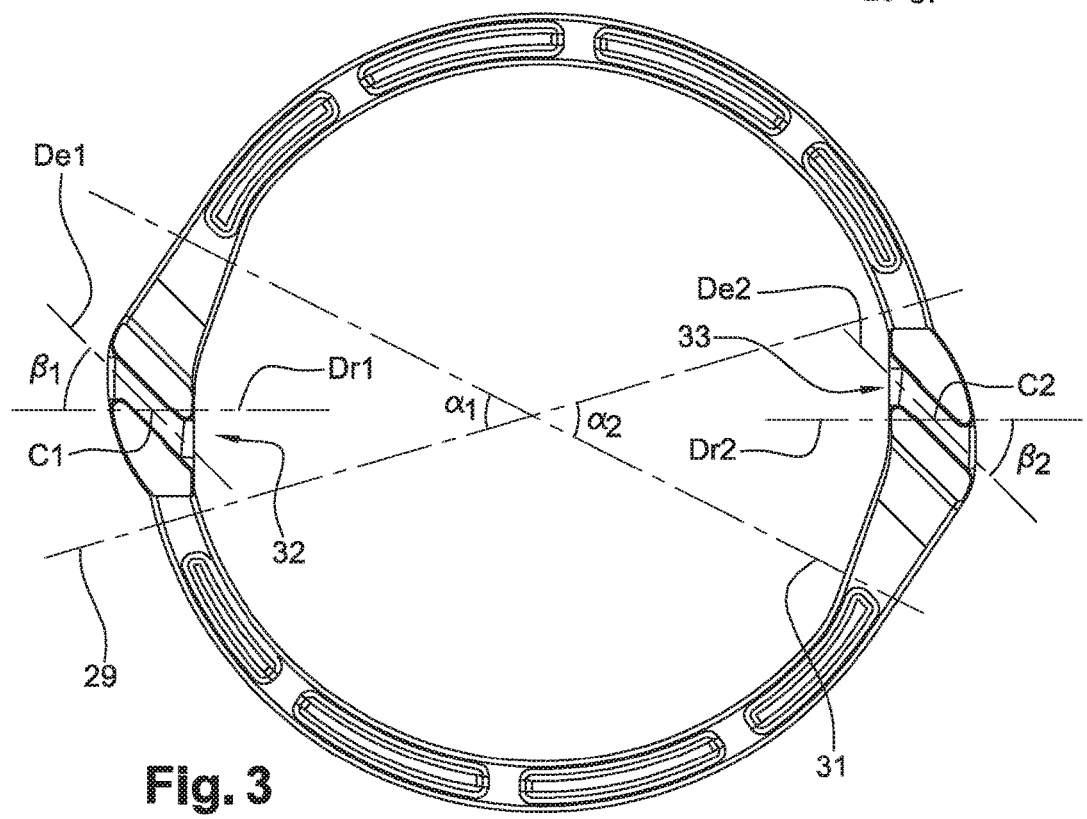

Turning to FIG. 3, the first and second angular sectors 29, 31 each has an opening angle $\alpha 1$, $\alpha 2$ less than 40°, and in one example less than 30°.

The first and second engaging grooves 32, 33 extend along a first extension direction De1 and a second extension direction De2 respectively, the first extension direction De1 and the second extension direction De2 are parallel to each other. The first and second extension directions De1, De2 are angled with respect to a first radial direction Dr1 and a second radial direction Dr2 which intersect a first center portion C1 and a second center portion C2 of the first and second engaging grooves 32, 33 respectively.

According to the embodiment shown in the figures, the first and second extension directions De1, De2 extend at an angle $\beta 1$, $\beta 2$ between 45 and 65°, advantageously between 50 and 60°, and in one example at about 55°, with respect to the first and second radial directions Dr1, Dr2.

Figure 13:
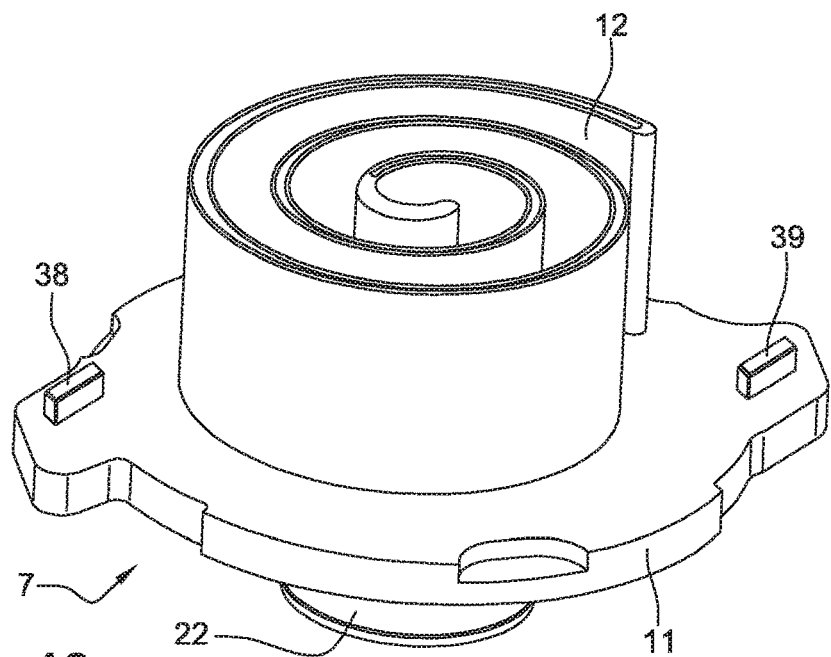
FIG. 13 is a perspective view of an orbiting scroll of the scroll compressor of FIG. 1.

Returning to FIG. 2, there is a third engaging groove 36 and a fourth engaging groove 37. As can be appreciated from FIG. 13, the third and fourth engaging grooves are configured to slidably receive a third complementary engaging rib 38 and a fourth complementary engaging rib 39 provided on the orbiting base plate 11. The third and fourth engaging grooves 36, 37, are diametrically opposed to each other, and are provided at least partially on the third and fourth protrusion parts 27, 28 respectively. The third and fourth engaging ribs 38, 39 are parallel to each other, and are diametrically opposed to each other.

The first engaging rib 35 is located substantially vertically above the third engaging rib 38, and the second engaging rib 35 is located substantially vertically above the fourth engaging rib 39. The specific locations of the first, second, third and fourth engaging grooves, and thus of the first, second, third and fourth engaging ribs, increase space for the fixed and orbiting spiral wraps 9, 12, and allow for an increase in the length of the fixed and orbiting spiral wraps 9, 12 without oversizing the scroll compressor.

Turning to FIG. 4, the third and fourth engaging grooves 36, 37 respectively extend along a third extension direction De3 and a fourth extension direction De4 which are parallel to each other. The third and fourth extension directions De3, De4 are angled with respect to a third radial direction Dr3 and a fourth radial direction Dr4 which intersect a third center portion C3 and a fourth center portion C4 of the third and fourth engaging grooves 36, 37 respectively.

According to the embodiment shown in FIG. 4, the third and fourth extension directions De3, De4 respectively extend at an angle β3, β4 between 45 and 65°, advantageously between 50 and 60°, and in one example at about 55°, with respect to the third and fourth radial directions Dr3, Dr4.

The first and third engaging grooves 32, 36 are configured such that projections of the first and third engaging grooves 32, 36 extend in a plane perpendicular to a center axis of the annular ring 24 and are secant with respect to the annular ring. The second and fourth engaging grooves 33, 37 are configured such that projections of the second and fourth engaging grooves 33, 37 extend in the plane perpendicular to the center axis of the annular ring 24 and are secant with respect to the annular ring. In other words, at least a portion of the first engaging groove 32 extends across at least a portion of the third engaging groove 36, and at least a portion of the second engaging groove 33 extends across at least a portion of the fourth engaging groove 37. When positioned horizontally, the grooves 32 and 33 are vertically above grooves 36 and 37 respectively.

The first, second, third and fourth engaging grooves 32, 33, 36, 37 are configured such that the first and third engaging grooves 32, 36 extend substantially at a right angle with respect to each other, and the second and fourth engaging grooves 33, 37 extend substantially at a right angle relative to each other.

Figure 10:
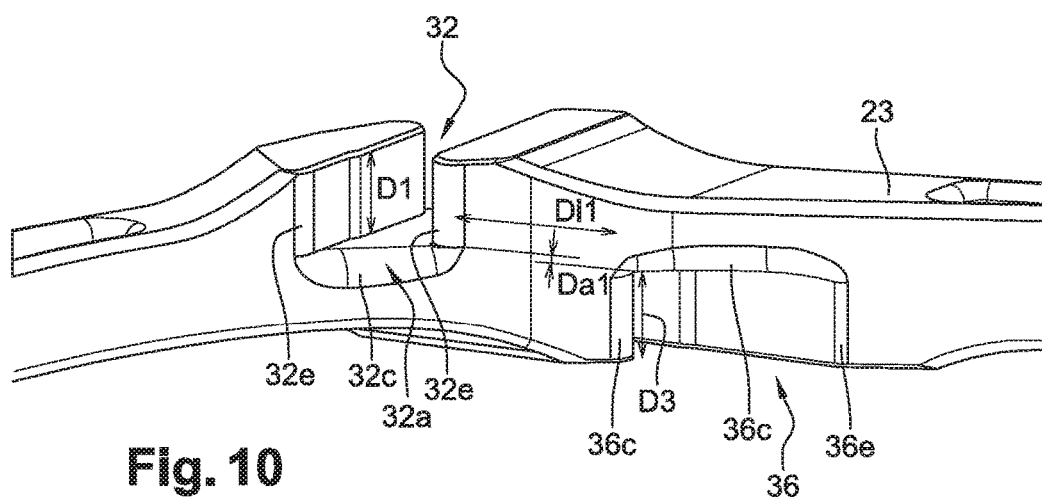
FIGS. 10 to 12 are partial enlarged perspective views of the Oldham coupling of FIG. 1.
Figure 11:
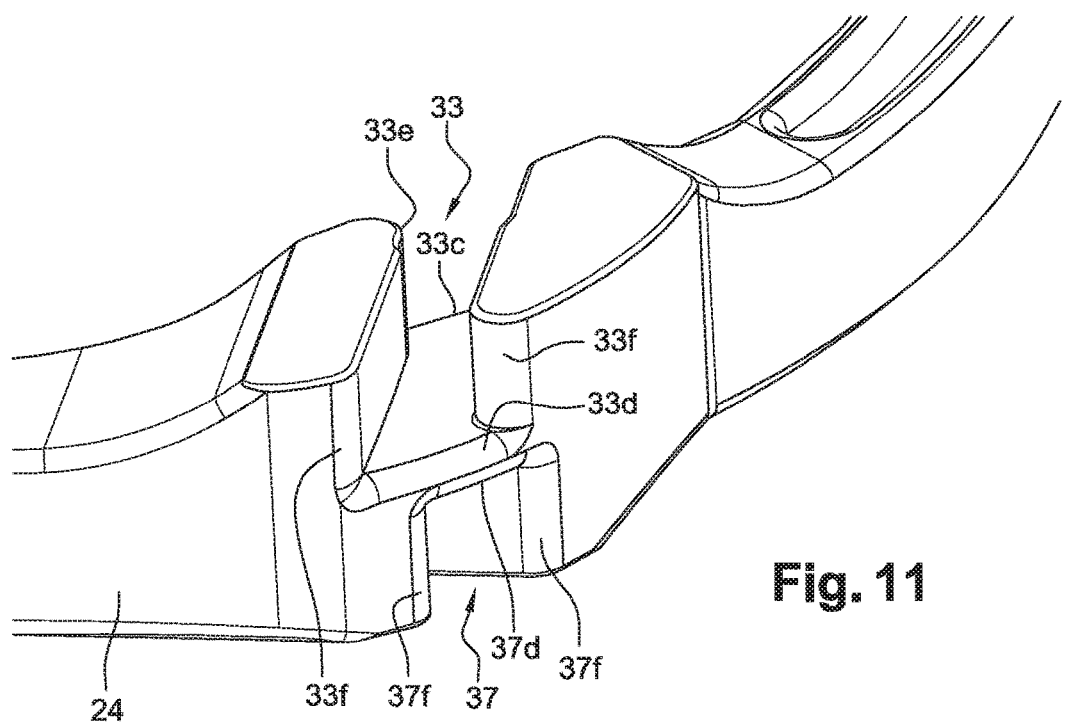
Figure 12:
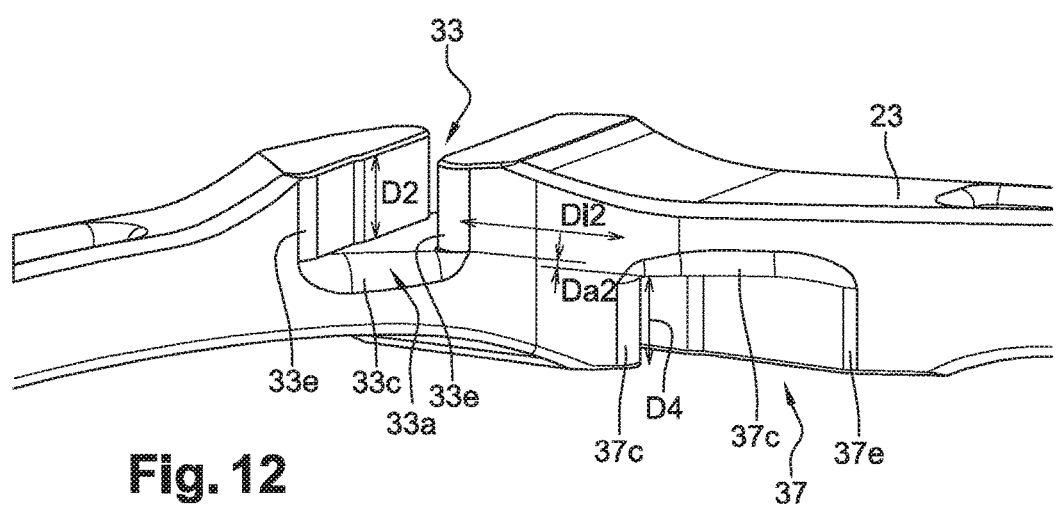

As can be appreciated from FIGS. 10 and 12, the depth D1 of the first engaging groove 32 is less than the depth D3 of the third engaging groove 36, and the depth D2 of the second engaging groove 33 is less than the depth D4 of the fourth engaging groove 37.

As can be appreciated from FIGS. 5 through 8, the width W1 of the first engaging groove 32 is less than the width W3 of the third engaging groove 36, and the width W2 of the second engaging groove 33 is less than the width W4 of the fourth engaging groove 37.

FIG. 5 shows that the first engaging groove 32 includes an inner groove end 32a and an outer groove end 32b emerging on an inner perimeter surface 41 and an outer perimeter surface 42 respectively of the annular ring 24.

FIG. 6 shows the second engaging groove 33 includes an inner groove end 33a and an outer groove end 33b emerging on the inner and outer perimeter surfaces 41, 42 respectively.

Figure 8:
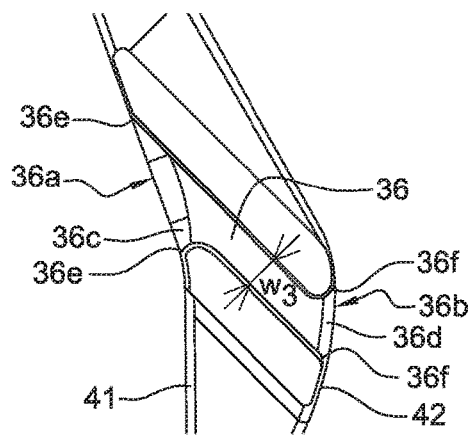
Figure 9:
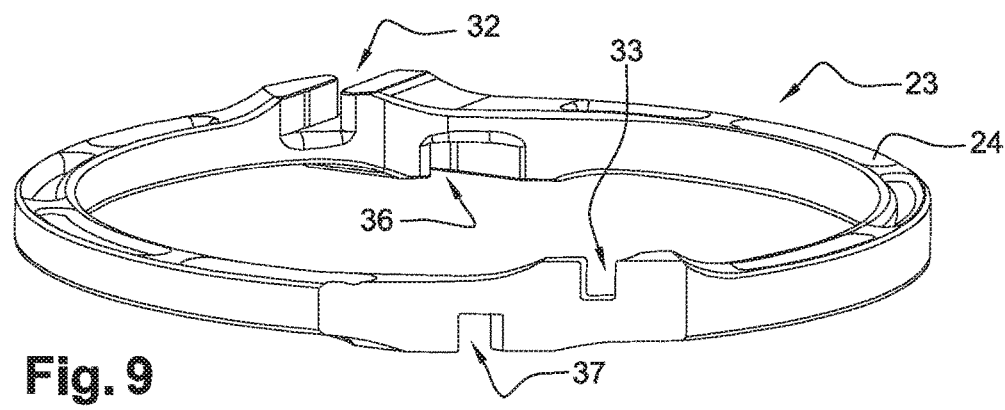
FIG. 9 is a perspective, partially sectioned view of the Oldham coupling of FIG. 1.

FIG. 8 shows the third engaging groove 36 includes an inner groove end 36a and an outer groove end 36b emerging on the inner and outer perimeter surfaces 41, 42 respectively.

Figure 7:
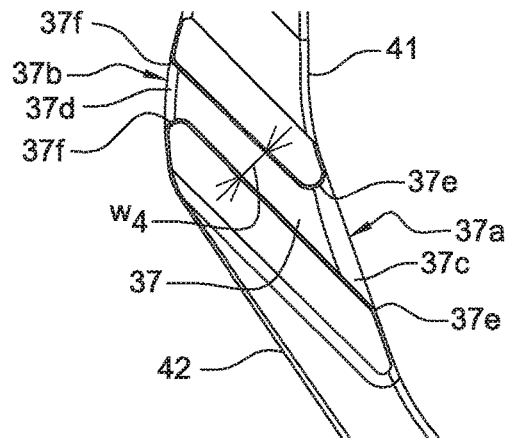
FIGS. 7 and 8 are enlarged views of details of FIG. 4.

FIG. 7 shows the fourth engaging groove 37 includes an inner groove end 37a and an outer groove end 37b emerging on the inner and outer perimeter surfaces 41, 42 respectively.

Turning to FIGS. 10 and 12, the inner groove ends 32a, 36a of the first and third engaging grooves 32, 36 are angularly offset from each other by a first inner distance Di1 greater than twice the width W1 of the first engaging groove 32, and the inner groove ends 33a, 37a of the second and fourth engaging grooves 33, 37 are angularly offset from each other by a second inner distance Di2 greater than twice the width W2 of the second engaging groove 33. These provisions minimize the maximal mechanical stresses applied on the inner perimeter surface 41 of the Oldham coupling 23, and thus limit risk of breaking of the Oldham coupling 23 without oversizing the Oldham coupling.

FIGS. 5 through 8 show the first engaging groove 32 includes an inner bottom edge 32c and an outer bottom edge 32d, the second engaging groove 33 includes an inner bottom edge 33c and an outer bottom edge 33d, the third engaging groove 36 includes an inner bottom edge 36c and an outer bottom edge 36d, and the fourth engaging groove 37 includes an inner bottom edge 37c and an outer bottom edge 37d. Advantageously, each of the inner bottom edges 32c, 33c, 36c, 37c of the first, second, third and fourth engaging grooves 32, 33, 36, 37 is delimited by an inner rounded convex surface, and each of the inner bottom edges 32d, 33d, 36d, 37d of each of the first, second, third and fourth engaging grooves 32, 33, 36, 37 is delimited by an outer rounded convex surface.

According to an embodiment of the invention, the radius of curvature of each of the inner and outer rounded convex surfaces is between 1 and 5 mm.

As can be appreciated from FIGS. 10 and 12, a first axial distance Da1 between the bottoms of the first and third engaging grooves 32, 36 is less than a third of the depth D1 of the first engaging groove 32, and a second axial distance Da2 between the bottoms of the second and fourth engaging grooves 33, 37 is less than a third of the depth D2 of the second engaging groove 33.

According to an embodiment of the invention, the depths D1, D2, D3, D4 of the first, second, third and fourth engaging grooves 32, 33, 36, 37 are respectively greater than the heights of the first, second, third and fourth protrusion parts 25, 26, 27, 28.

FIGS. 5 through 8 show the first engaging groove 32 includes a first and a second inner lateral edge 32e and a first and a second outer lateral edge 32f, the second engaging groove 33 includes a first and a second inner lateral edge 33e and a first and a second outer lateral edge 33f, the third engaging groove 36 includes a first and a second inner lateral edge 36e and a first and a second outer lateral edge 36f, and the fourth engaging groove 37 includes a first and a second inner lateral edge 37e and a first and a second outer lateral edge 37f. Advantageously, each of the first and second inner lateral edges 32e, 33e, 36e, 37e of the first, second, third and fourth engaging grooves 32, 33, 36, 37 is delimited by an inner lateral rounded convex surface, and each of the first and second outer lateral edges 32f, 33f, 36f, 37f of each of the first, second, third and fourth engaging grooves 32, 33, 36, 37 is delimited by an outer lateral rounded convex surface.

According to an embodiment of the invention, the radius of curvature of each of the inner and outer lateral rounded convex surfaces is between 1 and 5 mm.

This configuration of the Oldham coupling, and notably the presence of engaging grooves on the Oldham coupling instead of engaging projections, significantly reduces the axial distance between the zones where average mechanical stresses are applied on both sides of the Oldham coupling, and thus significantly reduces the tipping moment of the Oldham coupling. Such a reduction of the tipping moment of the Oldham coupling ensures an optimal sliding of the first, second, third and fourth engaging grooves respectively in the first, second, third and fourth corresponding engaging projections, and therefore improves the efficiency of the compression unit.

Further, the specific locations of the first, second, third and fourth engaging grooves increases space for the fixed and orbiting spiral wraps on the scroll compressor, and allows to increase the length of the fixed and orbiting spiral wraps without oversizing the compression unit, which results in an improvement of the performances of the scroll compressor.

Moreover, locating the first, second, third and fourth engaging projections on the scroll compressor, specifically on parts of the scroll compressor made of a rigid material, particularly cast iron, avoids any breaking of the first, second, third and fourth engaging projections, which improves the reliability of the scroll compressor.

Notably, the disclosed scroll compressor biases the orbiting scroll into the fixed scroll. However, the Oldham coupling of this disclosure extends to scroll compressors where there is a biased non-orbiting scroll (i.e. it can move axially) in place of the fixed scroll. Thus for purposes of this application the term non-orbiting scroll covers both fixed and biased non-orbiting scroll members.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An Oldham coupling for a scroll compressor, the Oldham coupling being configured to prevent relative rotation of an orbiting scroll and a non-orbiting scroll of the scroll compressor, the Oldham coupling including:
    an annular ring having a first side and a second side opposite to the first side;
    a first and a second engaging groove configured to be slidably engaged with a first and a second complementary engaging projection provided on a non-orbiting element, the first and second engaging grooves are diametrically opposed to each other and provided on the first side of the annular ring;
    a third and a fourth engaging groove configured to be slidably engaged with a third and a fourth complementary engaging projection provided on an orbiting scroll of a scroll compressor, the third and fourth engaging grooves are diametrically opposed to each other and provided on the second side of the annular ring;
    wherein the first and third engaging grooves are located in a first angular sector of the annular ring, and the second and fourth engaging grooves are located in a second angular sector of the annular ring, diametrically opposed to the first angular sector, the first and second angular sectors each having an opening angle less than 40°; and
    wherein a depth of the first engaging groove is less than a depth of the third engaging groove, and a depth of the second engaging groove is less than a depth of the fourth engaging groove.

2. The Oldham coupling according to claim 1, wherein the first and third engaging grooves are configured such that projections of the first and third engaging grooves extend in a plane perpendicular to a center axis of the annular ring, and are secant with respect to the annular ring, and the second and fourth engaging grooves are configured such that projections of said second and fourth engaging grooves extend in a plane perpendicular to the center axis of the annular ring are secant with respect to the annular ring.

3. The Oldham coupling according to claim 1, wherein the first and third engaging grooves extend substantially at a right angle with respect to each other, and the second and fourth engaging grooves extend substantially at a right angle relative to each other.

4. The Oldham coupling according to claim 1, wherein a first axial distance between a bottom surface of the first engaging groove and a bottom surface of a third engaging groove is less than half of a depth of the first engaging groove, and a second axial distance between a bottoms surface of the second engaging groove and a bottom surface of the fourth engaging groove is less than a half of a depth of the second engaging groove.

5. The Oldham coupling according to claim 1, wherein a width of the first engaging groove is less than a width of the third engaging groove, and a width of the second engaging groove is less than a width of the fourth engaging groove.

6. The Oldham coupling according to claim 1, wherein each of the first, second, third and fourth engaging grooves includes an inner groove end and an outer groove end emerging on an inner perimeter surface and an outer perimeter surface of the annular ring respectively.

7. The Oldham coupling according to claim 6, wherein a bottom surface of each of the first, second, third and fourth engaging grooves includes an inner bottom edge and an outer bottom edge, the inner and outer bottom edges of at least one of the first, second, third and fourth engaging groove are delimited by an inner rounded convex surface and an outer rounded convex surface respectively.

8. The Oldham coupling according to claim 6, wherein the inner groove ends of the first and third engaging grooves are angularly offset from each other by a first inner distance greater than twice a width of the first engaging groove, and the inner groove ends of the second and fourth engaging grooves are angularly offset from each other by a second inner distance greater than twice a width of the second engaging groove.

9. The Oldham coupling according to claim 1, further including:
    a first and second protrusion part projecting from the first side of the annular ring, the first and second engaging grooves being provided at least partially on the first and second protrusion parts respectively;
    a third and fourth protrusion part projecting from the second side of the annular ring, the third and fourth engaging grooves being provided at least partially on the third and fourth protrusion parts respectively;
    wherein the first and third protrusion parts are located in the first angular sector of the annular ring, and the second and fourth protrusion parts are located in the second angular sector of the annular ring.

10. The Oldham coupling according to claim 9, wherein depths of the first, second, third and fourth engaging grooves are respectively greater than heights of the first, second, third and fourth protrusion parts.

11. The Oldham coupling according to claim 1, wherein the first and second engaging grooves extend along a first and a second extension direction respectively, the first and second extension directions being substantially parallel to each other, and the third and fourth engaging grooves extend along a third and a fourth extension direction respectively, the third and fourth extension directions being substantially parallel to each other.

12. The Oldham coupling according to claim 11, wherein the first and second extension directions are angled with respect to a first and a second radial direction which intersect a first and a second center portion of the first and second engaging grooves respectively, and the third and fourth extension directions are angled with respect to a third and a fourth radial direction which intersect a third and a fourth center portion of the third and fourth engaging grooves respectively.

13. A scroll compressor including:
a compression unit including a non-orbiting scroll having a non-orbiting base plate and a non-orbiting spiral wrap, and an orbiting scroll having an orbiting base plate and an orbiting spiral wrap, the non-orbiting spiral wrap and the orbiting spiral wrap forming a plurality of compression chambers,
a drive shaft including a driving portion configured to drive the orbiting scroll in an orbital movement; and
an Oldham coupling including:
an annular ring having a first side and a second side opposite to the first side;
a first and a second engaging groove configured to be slidably engaged with a first and a second complementary engaging projection provided on a non-orbiting element, the first and second engaging grooves being diametrically opposed to each other and provided on the first side of the annular ring;
a third and a fourth engaging groove configured to be slidably engaged with a third and a fourth complementary engaging projection provided on the orbiting base plate, the third and fourth engaging grooves being diametrically opposed to each other and provided on the second side of the annular ring;
wherein the first and third engaging grooves are located in a first angular sector of the annular ring, and the second and fourth engaging grooves are located in a second angular sector of the annular ring, diametrically opposed to the first angular sector, the first and second angular sectors each having an opening angle less than 40°; and
wherein a depth of the first engaging groove is less than a depth of the third engaging groove, and a depth of the second engaging groove is less than a depth of the fourth engaging groove.

14. The scroll compressor according to claim 13, further including a fixed support member configured to slidably support the orbiting scroll, the Oldham coupling being disposed between the orbiting scroll and one of the non-orbiting scroll and the fixed support member, and said non-orbiting element being on said one of the non-orbiting scroll and the fixed support member.

15. The scroll compressor according to claim 14, wherein said one of the said non-orbiting scroll and the fixed support member includes a first and a second engaging projection configured to be slidably engaged with the first and second engaging grooves provided on the Oldham coupling respectively, and the orbiting scroll includes a third and a fourth engaging projection configured to be slidably engaged in the third and fourth engaging grooves provided on the Oldham coupling respectively.

* * * * *